United States Patent
Suzuki et al.

(10) Patent No.: US 6,359,659 B1
(45) Date of Patent: Mar. 19, 2002

(54) CONTOUR EMPHASIZING CIRCUIT

(75) Inventors: Susumu Suzuki; Masanori Kurita, both of Kanagawa-ken (JP)

(73) Assignee: Fujitsu General Limited, Kawasaki (JP)

(*) Notice: Subject to any disclaimer, the term of this patent is extended or adjusted under 35 U.S.C. 154(b) by 0 days.

(21) Appl. No.: 09/402,026

(22) PCT Filed: Mar. 25, 1997

(86) PCT No.: PCT/JP97/00994

§ 371 Date: Sep. 24, 1999

§ 102(e) Date: Sep. 24, 1999

(87) PCT Pub. No.: WO98/43409

PCT Pub. Date: Oct. 1, 1998

(51) Int. Cl.[7] ............................................... H04N 5/208
(52) U.S. Cl. ..................................... 348/625; 348/630
(58) Field of Search ............................... 348/625, 630, 348/627, 628, 629, 631; 382/266; H04N 5/21, 5/208

(56) References Cited

U.S. PATENT DOCUMENTS 5,767,900 A * 6/1998 Tanji ........................... 348/625

FOREIGN PATENT DOCUMENTS

| JP | 62-154892 | 7/1987 |
| JP | 1-259464 | 10/1989 |
| JP | 8-65548 | 3/1996 |
| JP | 8-163412 | 6/1996 |
| JP | 8-186739 | 7/1996 |

* cited by examiner

Primary Examiner—Sherrie Hsia
(74) Attorney, Agent, or Firm—Flynn, Thiel, Boutell & Tanis, P.C.

(57) ABSTRACT

A contour emphasizing circuit has a Y-signal generator (36) which generates a luminance signal from digital R, G and B signals, a contour extracting circuit (38) which extracts contour component from the generated Y signal, a factor multiplier (42) which multiplies the contour component by factors Kr, Kg and Kb and outputs contour components for R, G and B and contour adders (34r, 34g and 34b) which add the contour components for R, G and B to the R, G and B signals respectively and which emphasizes the contour for the digital R, G and B signals.

7 Claims, 6 Drawing Sheets

(a) A/D conversion when large signal is input (b) A/D conversion when contour emphasizing quantity is "large"

CONTOUR EMPHASIZING CIRCUIT

TECHNICAL FIELD

The present invention relates to a contour emphasizing circuit, wherein a digital contour-emphasized video signal on the basis of the input of an analog signal is output, and is employed to provide contour-emphasized color video signals for a display device (for example, matrix type display device) which is digitally driven such as a plasma display (referred only to as PDP) and liquid crystal display (referred only to as LCD).

BACKGROUND ART

In the conventional CRT (Cathode Ray Tube) display device, the contour emphasizing processing is being carried out aiming at the high picture quality implementation and high pass characteristic compensation. The contour emphasizing circuit to carry out this contour emphasizing processing is, as shown in FIG. 1, composed of a Y/C separation circuit 10, a color demodulation circuit 12, a contour extracting circuit, phase adjustment circuits 16, 18 and 20, an adder 22 and a matrix circuit 24.

The Y/C separation circuit 10 separates a Y (luminance) signal and a C (color) signal from the composite video signal (for example, compound color television signal) input to an input terminal 26, and the color modulation circuit 12 separates a Y signal, an R−Y (color difference) signal and a B−Y (color difference) signal on the basis of a Y signal and a C signal.

The contour extracting circuit 14 extracts the contour component Ye which is a high-pass component of a video signal on the basis of an adder 22.

The matrix circuit 24 prepares a signal adding the contour component Ye to the R (red), G (green) and B (blue) signals, respectively, on the basis of (Y+Ye) signals added by the adder 22, an (R−Y) and a (B−Y) signal phase-adjusted by phase adjustment circuits 18 and 20. That is to say, the matrix circuit 24 prepares R+Ye, G+Ye and B+Ye on the basis of the operations in following equations (1), (2) and (3). By outputting these R+Ye, G+Ye and B+Ye to the CRT display device by means of output terminals 28r, 28g and 28b, videos contour-emphasized by this CRT display device are displayed.

$$(R-Y)+(Y+Ye)=R+Ye \quad (1)$$

$$(G-Y)+(Y+Ye)=G+Ye \quad (2)$$

$$(B-Y)+(Y+Ye)=B+Ye \quad (3)$$

(G−Y) in the above equation (2) is generated by the following equation (4).

In case of a video contour-emphasized by a matrix type display device driven by digital video signals (for example, R, G and B signals) like PDP and LCD is displayed, each signal of (R+Ye), (G+Ye) and (B+Ye) obtained in output terminals 28r, 28g and 28b in FIG. 1 is output to the display device after being digitized by the A/D (analog/digital) conversion circuit. However, in such a prior example, in case a large amplitude signal is input to an input terminal 26, or in case the contour emphasizing quantity (or contour emphasizing coefficient, the description is omitted, as it is similar afterwards) is "large", there is a problem that the correct operation cannot be obtained over the dynamic range of A/D conversion circuit.

For example, in case a large amplitude signal is input in the input terminal 26, by outputting a signal over the dynamic range of an A/D conversion circuit as shown at the left-hand side in FIG. 2(a) from output terminals 28r, 28g and 28b, there are problems that signals exceeding an upper conversion reference voltage value VRT (for example, 5 volts) in the dynamic range as shown at the right-hand in said figure (a) are cut, resulting in producing white crushing or signals under the lower conversion reference voltage value VRT (for example, 3 volts) in the dynamic range are cut, resulting in producing black crushing.

Further, in case the contour emphasizing quantity of the contour extracting circuit 14 is "large", there are problems that signals over the dynamic range of the A/D conversion circuit as shown at the left-hand side in FIG. 2(b) are cut, resulting in producing white crushing or signals under the lower conversion reference voltage value VRB are cut, resulting in producing black crushing.

The present invention is carried out taking into account said problems, and even when a large amplitude signal, wherein white crushing or black crushing is input in the contour emphasizing circuit in FIG. 1, or even when the contour emphasizing quantity is "large", aims at providing a contour emphasizing circuit that can display a contour emphasizing video without white crushing or black crushing in a display device driven by a digital video signal.

DISCLOSURE OF THE INVENTION

The contour emphasizing circuit according to the present invention is characterized by being provided with an A/D conversion circuit to convert analog color video signals (for example, R, G and B signals) to digital color video signals, a Y signal generation circuit to generate a Y signal from these digital color video signals, a contour extracting circuit to extract a contour component from the generated Y signal, and a contour adder to output a signal contour-emphasized by adding the extracted contour component to the digital color video signals output from the A/D conversion circuit.

Since a Y signal is generated after analog color video signals are converted to a digital signal by the A/D conversion circuit, and the contour component extracted from this Y signal is added to digital color video signals output from the A/D conversion circuit, there is no contour emphasizing component over the dynamic range of A/D conversion circuit as with the prior example. For this reason, in case analog color video signals to input in the contour emphasizing circuit of the present invention are large amplitude signals, or even in case the contour emphasizing quantity is "large", in case a signal output from the contour emphasizing circuit of the present invention is output to the display device driven by a digital video signal and a contour emphasizing video is displayed, neither white crushing nor black crushing is produced.

Hence, to output a video signal adding a vertical contour component and a horizontal contour component and to be able to display a video emphasizing contours in vertical and horizontal directions, the contour extracting circuit comprises first and second line memories, a vertical contour extracting circuit, a contour emphasizing frequency setting circuit, a horizontal contour extracting circuit and a contour synthesis circuit.

Further, to simplify the circuit configuration of the contour emphasizing frequency setting circuit, it comprises 1-dot delay elements of four contour emphasizing frequency setting circuits connected in series, a Y signal of 2-dot delay is output from the second 1-dot delay element, and a Y signal of 4-dot delay is output from the fourth 1-dot delay element.

Further, to avoid a noise influence, in the contour extracting circuit, a core ring circuit to suppress the contour component of less than a level is provided.

Further, to make the contour emphasizing quantity large, a gain controller to adjust the size of the contour component extracted in the contour extracting circuit and a coefficient multiplication circuit to output to the contour adder after multiplying by coefficients Kr, Kg and Kb.

BEST MODE TO REALIZE THE INVENTION

Below, to explain in detail the present invention, this will be explained on the basis of the attached drawings.

Figure 3:
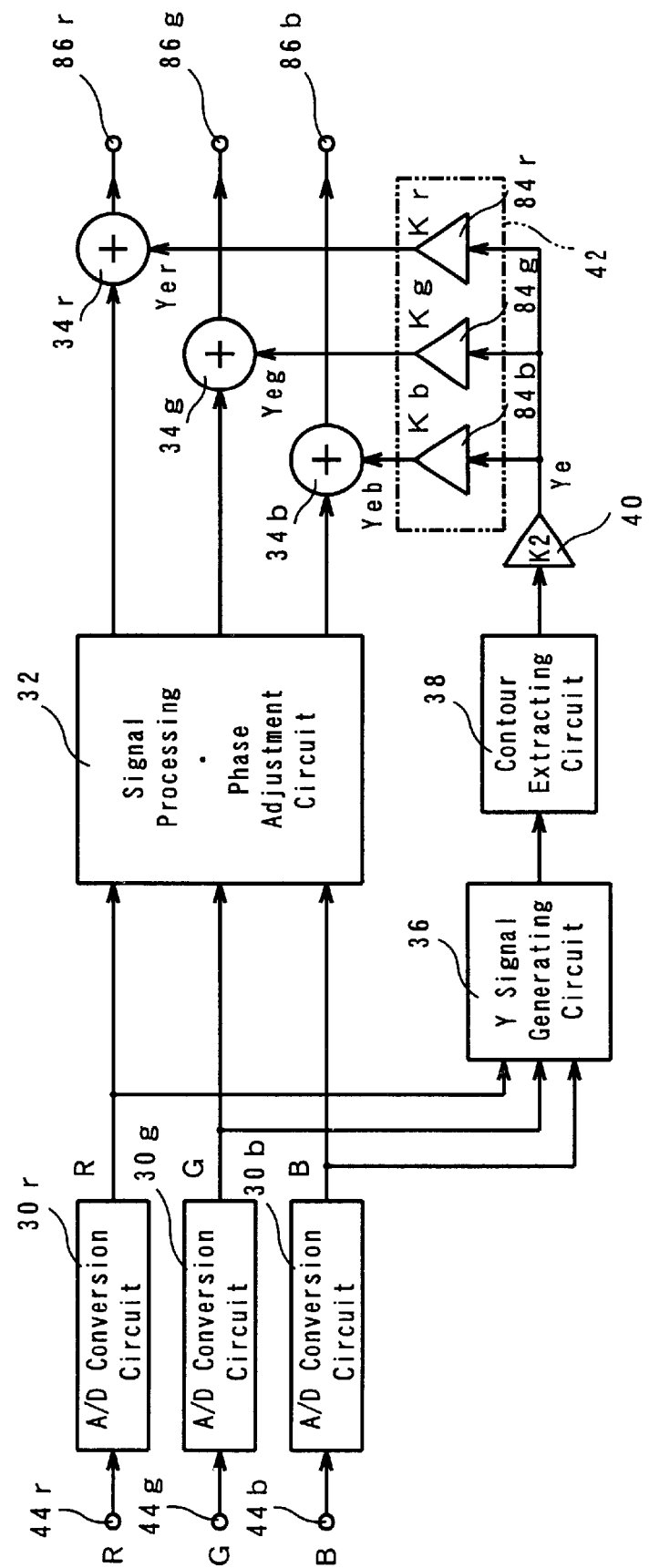
FIG. 3 is a block diagram showing an embodiment of the contour emphasizing circuit according to the present invention.

FIG. 3 shows an embodiment of the present invention. In this FIG. 3, 30r, 30g and 30b are A/D conversion circuits, 32 is a signal processing/phase adjustment circuit, 34r, 34g and 34b are contour adders, 36 is a Y signal generation circuit, 38 is a contour extracting circuit, 40 is a gain controller for the contour component, and 42 is a coefficient multiplication circuit.

Said A/D conversion circuits 30r, 30g and 30b are constituted, respectively, so that the analog R, G and B signals input to the input terminals 44r, 44g and 44b are converted for output to digital R, G and B signals of 8-bits resolution.

Said signal processing/phase adjustment circuit 32 carries out signal processing like picture element number conversion, gamma correction, etc. to the R, G and B signals output from said A/D conversion circuits 30r, 30g and 30b, as well as carrying out the phase adjustment to adjust the delay difference. Said picture element number conversion denotes the processing to carry out the sample number rate conversion of 8-bits digital R, G and B signals to match with the displayed picture element number of the display device, and said gamma correction processing denotes the processing to correct the luminous characteristic of the display device. Said phase adjustment employs a 1-dot delay element, etc. composed of a D-FF (D type flip flop), and denotes the processing to adjust the delay difference between the delay time required for the signal processing like said picture element number conversion, gamma correction, etc. and the delay time required for the signal processing in said Y signal generation circuit 36, contour extracting circuit 38, gain controller 40 and coefficient multiplication circuit 42.

Figure 4:
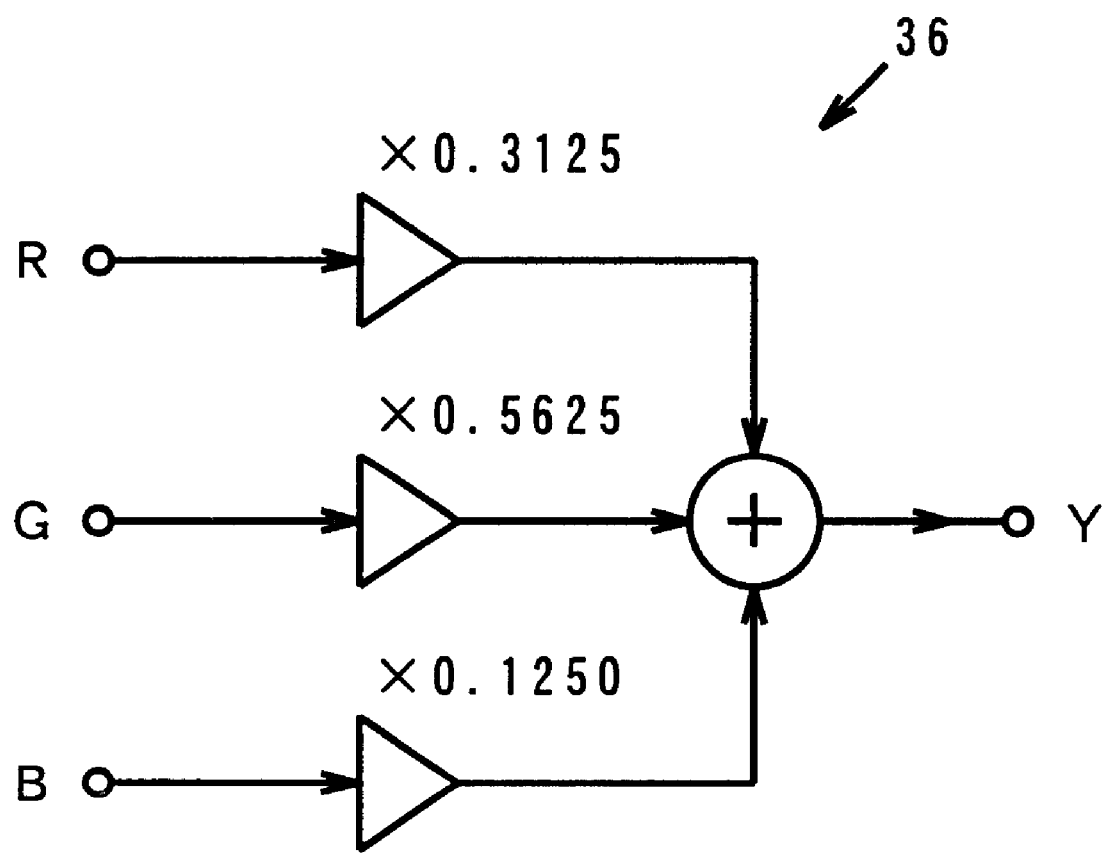
FIG. 4 is a block diagram showing an example of the Y signal generation circuit in FIG. 3.

Said Y signal generation circuit 36 is constituted so that a Y (luminance) signal is generated from digital R, G and B signals output from said A/D conversion circuits 30r, 30g and 30b. This Y signal generation circuit 36 is realized by the method to obtain the approximate value of a Y signal to satisfy the following equations 5 and 6 by the pith addition as shown in FIG. 4.

$$Y=(0.3 \times R)+(0.59 \times G)+(0.11 \times B) \quad (5)$$

$$Y=0.3125 \times R+0.5625 \times G+0.1250 \times B \quad (6)$$

Said contour extracting circuit 38 is constituted so that the contour component will be extracted for output from a Y signal generated in the Y signal generation circuit 36. This contour extracting circuit 8 is constituted concretely as shown in FIG. 5.

Figure 5:
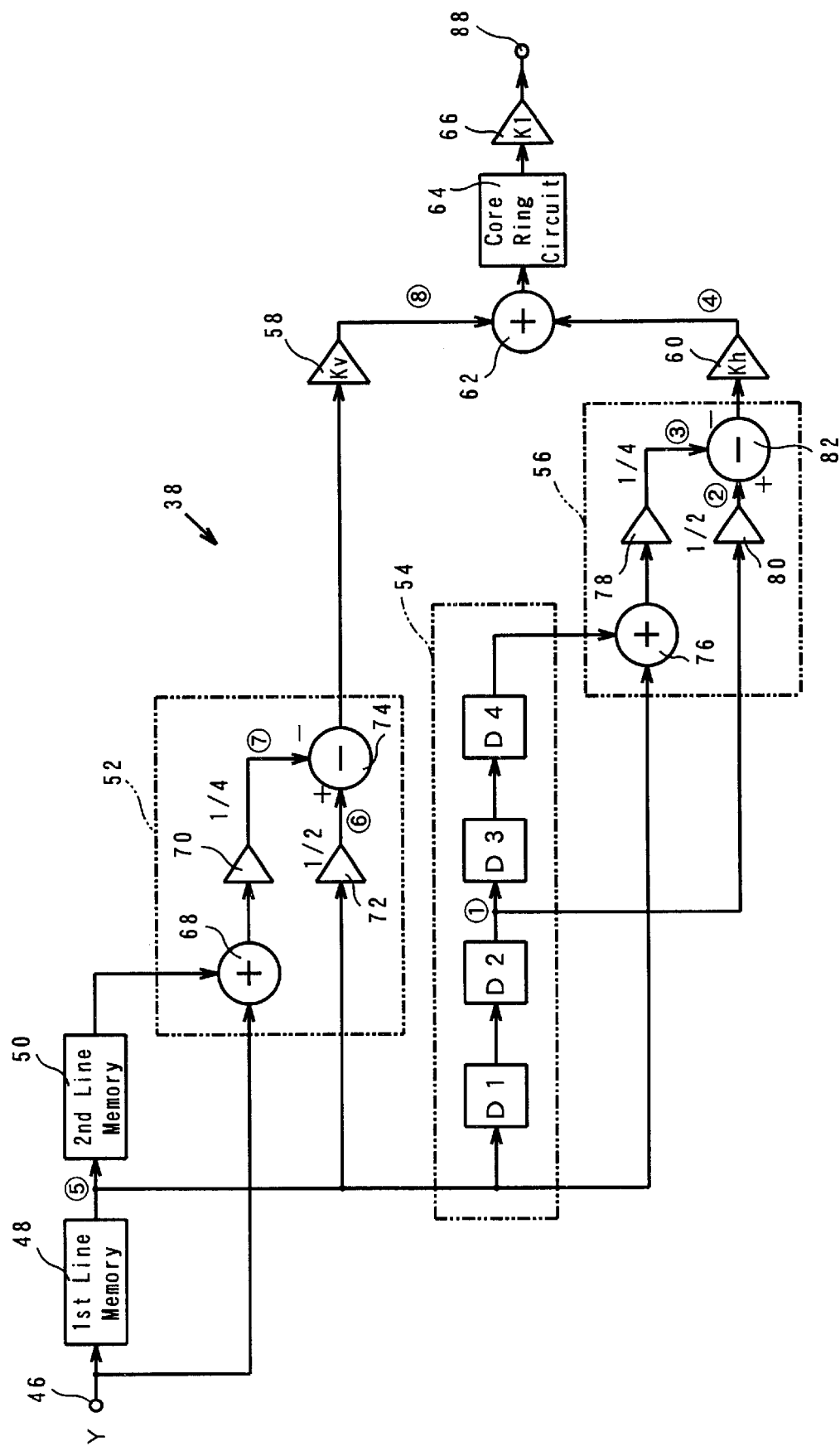
FIG. 5 is a block diagram showing an example of the contour extracting circuit in FIG. 3.

In FIG. 5, 46 denotes an input terminal for the Y signal, 48 and 50 denote first and second line memories as 1-line delay elements, 52 denotes a vertical contour extracting circuit, 54 denotes a contour emphasizing frequency setting circuit, 56 denotes a horizontal contour extracting circuit, 58 denotes a gain controller of a vertical contour component, 60 denotes a gain controller of a horizontal contour component, 62 denotes a contour synthesis circuit, 64 denotes a core ring circuit and 66 denotes a gain controller.

Said first and second line memories 48 and 50 generate for output, after a Y signal is input to said input terminal 46, a Y signal delayed gradually in the portion of 1 line (portion of 1 scanning line).

Said vertical contour extracting circuit 52 comprises an adder 68 adding for output a Y signal input to said input terminal 46 and a Y signal of 2-line delay output from said second line memory 50, a multiplier 70 for multiplying for output a coefficient (¼) to an output signal of the adder 68, a multiplier 72 for multiplying for output a coefficient (½) to a Y signal of 1-line line delay output from said first line memory 48, and a subtracter 74 subtracting an output signal of said multiplier 70 from an output signal of said multiplier 72.

Said contour emphasizing frequency setting circuit 54 is a circuit for setting the contour emphasizing frequency to the specified frequency (for example, ½ of sampling frequency Fs), and specifically, comprises a 5-tap type composed of four 1-dot delay elements D1 through D4 for delaying a Y signal output from said first line memory 48 gradually in the portion of 1 dot (portion of 1 picture element). Said 1-dot delay elements D1 through D4 comprise, for example, D-FF (D type flip flop) elements, respectively. Further, said contour emphasizing frequency setting circuit 54 is not limited to the 5-tap type, and may be of the 7-tap type composed of six 1-dot delay elements D1 through D6 connected in series.

Said horizontal contour extracting circuit 56 adds a Y signal output from said first line memory 48 to an adder 76 to a Y signal of 4-dot delay output from the fourth 1-dot delay element D4, a multiplier 80 for multiplying for output a coefficient (½) to a Y signal of 2-dot delay output from the second 1-dot delay element D2, a multiplier 78 for multiplying for output a coefficient (¼) to an output signal of said adder 76 and a subtracter 82 for subtracting an output signal of said multiplier 78 from an output signal of said multiplier 80.

Said gain controller 58 multiplies an adjustable coefficient Kv to a vertical contour component extracted in said vertical contour extracting circuit 52.

Said gain controller 60 multiplies an adjustable coefficient Kh to a horizontal contour component extracted in said horizontal contour extracting circuit 56. Said contour synthesis circuit 62 output is from synthesizing contour components input thereto, respectively, from said gain controllers 58 and 60.

Figure 6:
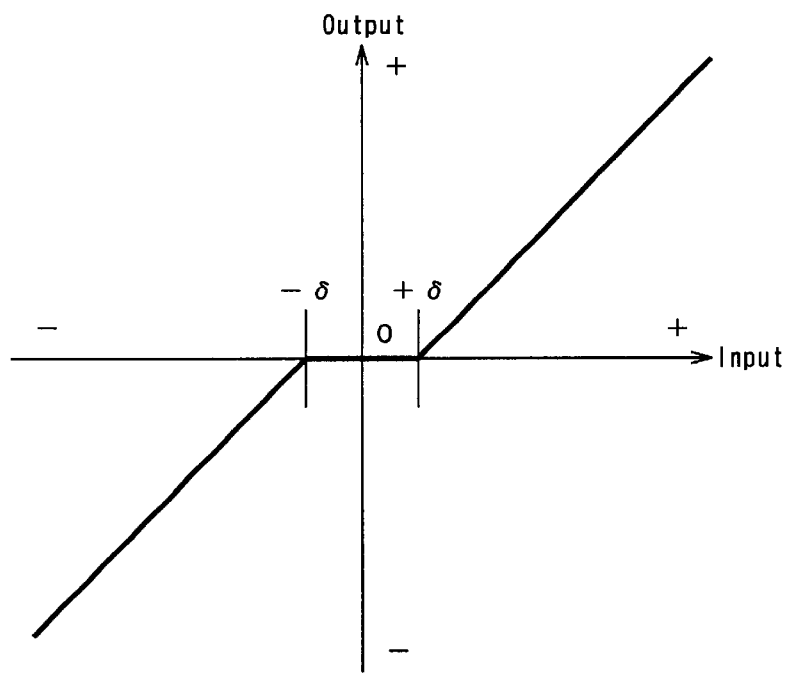
FIG. 6 is a characteristic diagram of the core ring circuit in FIG. 5.

Said core ring circuit 64 eliminates noise and minute contour components, receives contour components output from said contour synthesis circuit 62 as an input, and suppresses contour components of less than a certain level of the contour components input. Said core ring circuit 64, for example, possesses the input-output characteristics as shown in FIG. 6. Specifically, it has been constituted so that when contour components input from the contour synthesis circuit 62 are positive or larger than 0–δ(δ is a positive constant) they will be added for output to the original components, and when they are negative or smaller than 0+δ, they will be added for output to the original components, and more, when their operational results are more than –δ and less than +δ the output will be fixed to 0.

Said gain controller 66 outputs to an output terminal 88 after multiplying an adjustable coefficient K1 to the contour components output from said core ring circuit 64.

Said gain controller 40 has been so constituted for output by multiplies an adjustable coefficient K2 to contour components output from said contour extracting circuit 38.

Said gain controllers 66 and 40 may omit one part (for example 66) as the need arises.

Said coefficient multiplication circuit 42 has multipliers 84r, 84g and 84b to output contour components Yer, Yeg and Yeb for R, G and B by multiplying coefficients Kr, Kg and Kb to the contour component output from said gain controller 40. Said coefficients Kr, Kg and Kb, not being limited to these, have been set to 0.3125, 0.5625 and 0.1250 values as coefficients (FIG. 4) of R, G and B so that said Y signal generation circuit 36 will generate a Y signal.

Said contour adders 34r, 34g and 34b output to the display device through output terminals 86r, 86g and 86b, and add contour components Yer, Yeg and Yeb, output from coefficient devices 84r, 84g and 84b of said coefficient multiplication circuit 42, to R, G and B signals processed by a phase adjustment in said signal processing/phase adjustment circuit 32.

Next, functions will be explained.

(1) In FIG. 3, analog R, G and B signals input to input terminals 44r, 44g and 44b are converted to 8-bits digital R, G and B signals by A/D conversion circuits 30r, 30g and 30b, signal-processed and phase-adjusted by the signal processing/phase adjustment circuit, and input to the other input side of contour adders 34r, 34g and 34b.

(2) The Y signal generation circuit 36 generates Y signals from digital R, G and B signals output from A/D conversion circuits 30r, 30g and 30b. For example, this Y signal generation circuit 36 generates Y signals from digital R, G and B signals by bit shift addition employing a circuit in FIG. 4.

(3) The contour extracting circuit 38 extracts contour components composed of the horizontal contour component and vertical contour component from Y signals. Next, the extraction function of contour components by this contour extraction circuit will be explained employing FIG. 5.

(3a) The functions to extract the horizontal contour component will be explained referring to FIG. 7.

Figure 7:
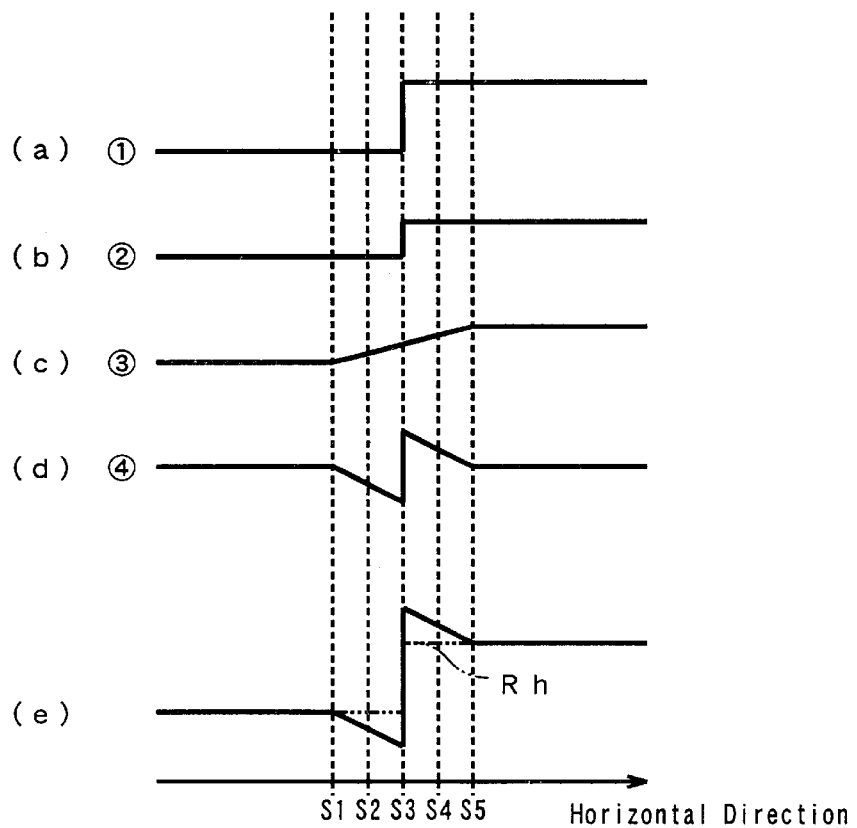
FIG. 7 shows the signal waveform relating to the contour emphasis in horizontal direction, (a) is a waveform diagram of signal (1) in FIG. 5, (b) is a waveform diagram of signal (2) in FIG. 5, (c) is a waveform diagram of signal (3) in FIG. 5, (d) is a waveform diagram of signal (4) in FIG. 5 and (e) is a waveform diagram of a component in the horizontal direction of a signal output to an output terminal 86r in FIG. 3.

Vertical lines S1, S2, S3, S4 and S5 expressed with dotted lines in FIG. 7 express sampling points of each picture element successively in line in the horizontal direction along with scanning lines including picture elements being processed.

If a Y signal output from the second 1-dot delay element D2 in the contour emphasizing frequency setting circuit 54 is made (1), a signal (2) output from the multiplier 80 of the horizontal contour extracting circuit 56 is made as shown in said figure (b) and is input to the + side of the subtracter 82.

A Y signal output from the 1-line memory 48 and a Y signal output from the fourth 1-dot delay element D4 of the contour emphasizing frequency setting circuit 54 are added by the adder 76 of the horizontal contour extracting circuit 56, multiplied by ¼ by the multiplier 78, and input in the – side of the subtracter as a signal (3), as shown in FIG. 7(c). Signals ((2) and (3)) operated on by this subtracter 82 are multiplied by Kh times the coefficient by the gain controller, and input to the other input side of the contour synthesis circuit 62 as a signal (4) as shown in FIG. 7.

(3b) Functions to extract the vertical contour component will be explained referring to FIG. 8.

Figure 8:
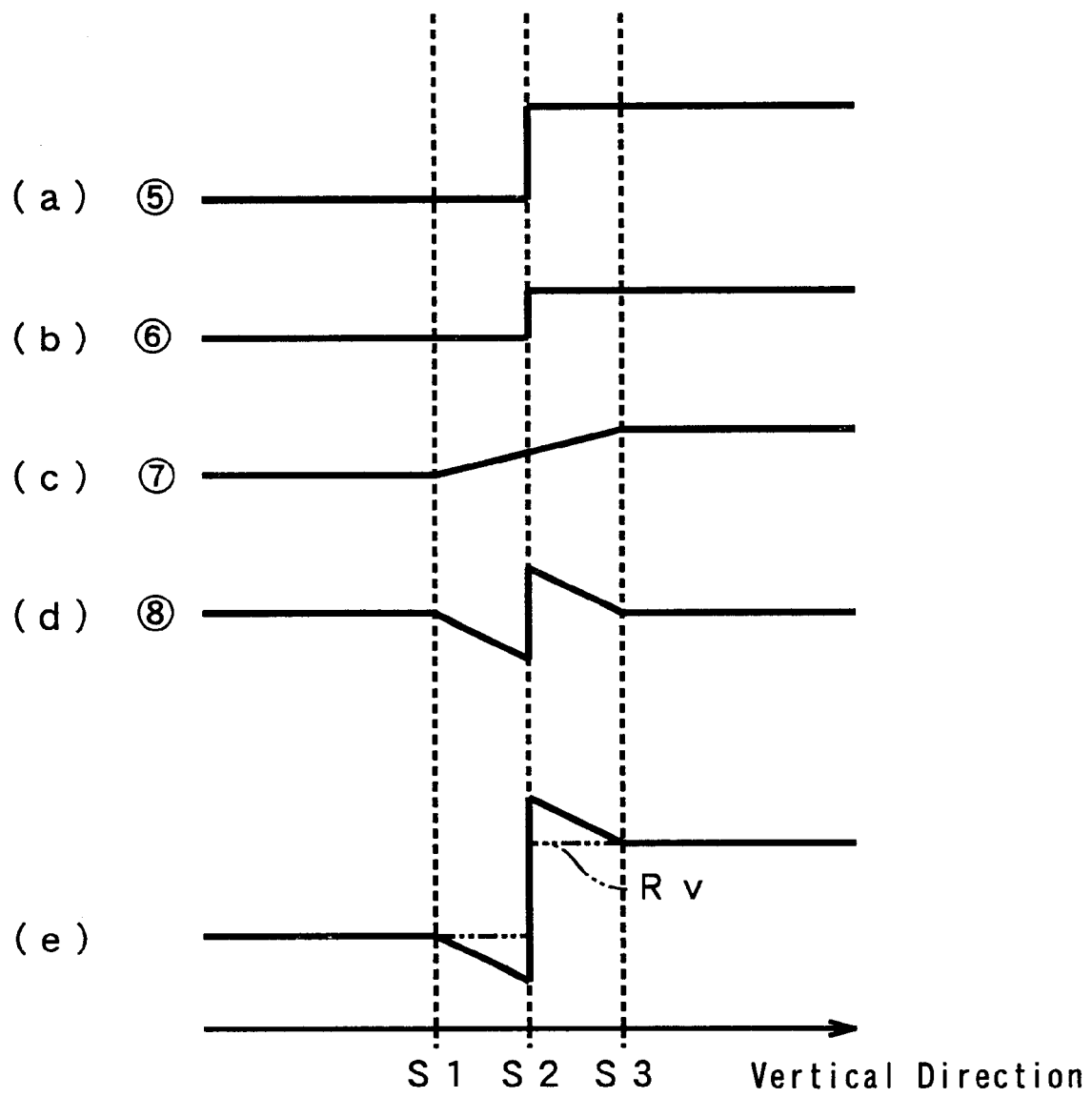
FIG. 8 shows a signal waveform relating to the contour emphasis in the vertical direction, (a) is a waveform diagram of signal (5) in FIG. 5, (b) is a waveform diagram of signal (6) in FIG. 5, (c) is a waveform diagram of signal (7) in FIG. 5, (d) is a waveform diagram of signal (8) in FIG. 5, and (c) is a waveform diagram of component in the vertical direction of a signal output to the output terminal 86r in FIG. 3.

Vertical lines S1, S2 and S3 expressed by dotted lines in FIG. 8 are picture elements on three scanning lines; scanning line including picture elements being processed and scanning lines back and forth, and express sampling points of three picture elements along the vertical direction including picture elements being processed.

In case a Y signal of 1-line delay output from a first line memory 48 is made (5) as shown in FIG. 8(a), a signal ⊕ output from the multiplier 72 of the vertical contour extracting circuit 52 is made as shown in said figure (b), and inputs in the + side of the subtracter 74. A Y signal input in the input terminal 46 and a Y signal of 2-line delay output from the second line memory 50 are added by the adder 68 of the vertical contour extracting circuit 52, multiplied by ¼ by the multiplier, and as shown in FIG. 8(c), enter in the – side of the subtracter 74 as a signal ∅. Signals (⊕) and (⊕) operated on by this subtracter 74 are multiplied by Kv times the coefficient by the gain controller 58, and input in the input side of the contour synthesis circuit 62 as a signal ∩ as shown in FIG. 8(d).

(3c) A signal ↓ expressing the horizontal contour component output from the gain controller 60 and a signal ≧ expressing the vertical contour component from the gain controller 58 are synthesized by the contour synthesis circuit 62, suppress contour components of less than a certain level by the core ring circuit 64, eliminate a noise influence, are level-adjusted by multiplying by the coefficient K1 in the gain controller, and output to the output terminal 88.

(4) Contour components output to the output terminal 88 are level-adjusted by being multiplied by the coefficient K2 by the gain controller 40, multiplied by coefficients Kr, Kg and Kb by multipliers 84r, 84g and 84b of the coefficient multiplication circuit 42, become contour components Yer, Yeg and Yeb for R, G and B, and input in another input side of corresponding contour adders 34r, 34g and 34b. For this reason, the contour emphasis quantity can make large R, G and B signals signal-processed and phase-adjusted by the signal processing/phase adjustment circuit 32 and contour components Yer, Yeg and Yeb for R, G and B output from multipliers 84r, 84g and 84b of the coefficient multiplication circuit 42 are added by contour adders 34r, 34g and 34b, output to the display device through output terminals 86r, 86g and 86b, and images contour-emphasized by this display device are displayed.

At this time, components in the horizontal direction of signals (R+Yeg) output to the output terminal 86r become as shown in FIG. 7(e) and components in vertical direction become as shown in FIG. 8(c). Rh and Rv are shown by the two-dot chain line in FIG. 7 and FIG. 8(e) express components in horizontal direction and components in vertical direction of R signals output from the signal processing/phase adjustment circuit 32.

Likewise, components in the horizontal direction and components in the vertical direction of (G+Yeg) and (B+Yeb) signals output to output terminals 86g and 86b are made similar to components in the horizontal direction and components in the vertical direction of (R+Yer) signals output to the output terminal 86r.

Figure 1:
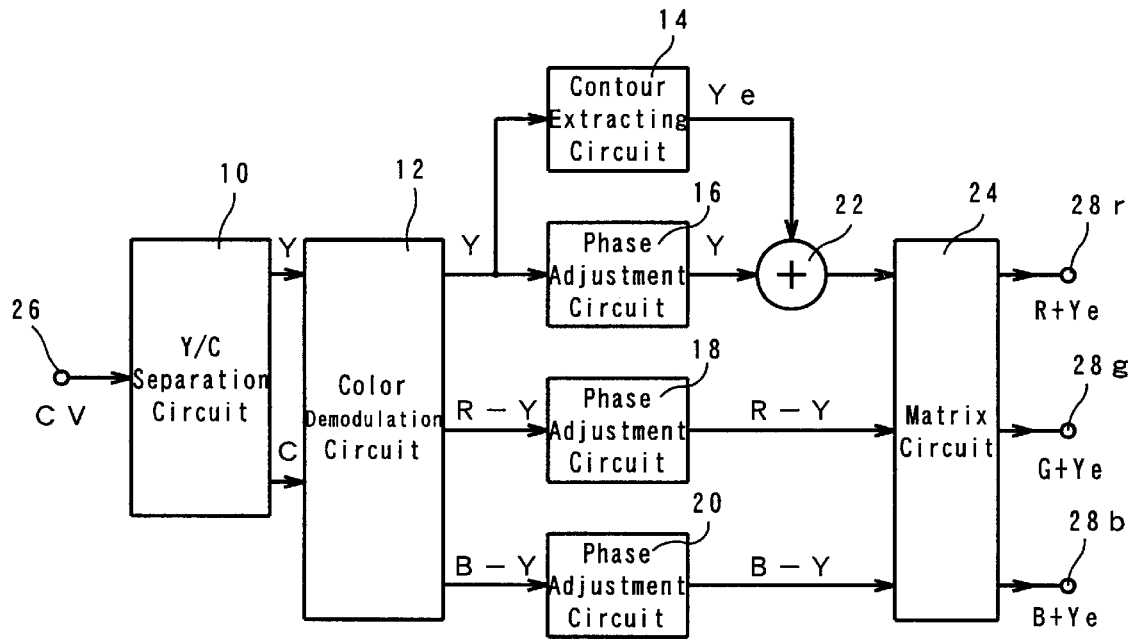
FIG. 1 is a block diagram showing a contour emphasizing circuit of prior example.
Figure 2:
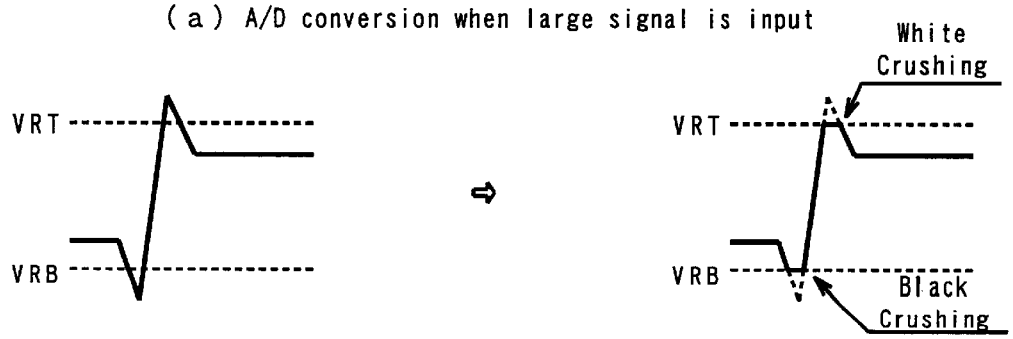
FIG. 2 shows problems when the signal obtained in the circuit in FIG. 1 is A/D converted, and output to a display device driven by a digital video signal, and (a) is a figure, showing that white crushing and black crushing are produced when a large amplitude signal is input, and (b) is a figure showing that white crushing and black crushing are produced when the contour emphasizing quantity is "large".
Figure 2:
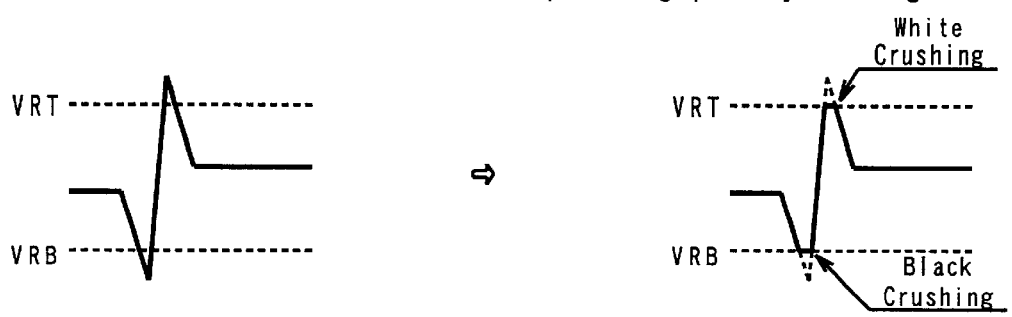

(5) As described above, since it has been designed so that a Y signal is generated after converting analog R, G and B signals to digital R, G and B signals by A/D conversion circuits 30r, 30g and 30b, and contour components extracted from this Y signal is added to original digital R, G and B signals, there are no contour emphasizing components like the prior example shown in FIG. 1 over the dynamic ranges of A/D conversion circuits. For this reason, analog R, G and B signals input to the contour emphasizing circuit of the present invention are large amplitude signals or even in case the contour emphasis quantity is "large", neither white crushing nor black crushing is produced when the video is displayed by the signals output from the contour emphasizing circuit of the present invention to the display device (for example, dot matrix type PDP display device) driven by digital R, G and B signals.

In the embodiment shown in FIG. 3, it is designed so that the contour emphasis quantity for R, G and B will be made large by multiplying coefficients Kr, Kg and Kb (Kr+Kg+Kb−1) of less than 1 to the gain controller 40 to output the size of contour components extracted by the contour extracting circuit 38 and its output signal, and installing the coefficient multiplication circuit 42 to output to contour adders 34r, 34g and 34b. The present invention is not limited to this, and can omit the gain controller 40 and coefficient multiplication circuit 42, and can utilize also what designed to output the output of the contour extracting circuit 38 directly to contour adders 34r, 34g and 34b.

In the embodiments shown in FIGS. 3 and 5, in the contour extracting circuit 38, a core ring circuit for suppressing the output to less than a certain level of the contour components output from the contour synthesis circuit 62 is installed to eliminate noise, but the present invention is not limited to this, and can omit this core ring circuit 64.

In the embodiments shown in FIGS. 3 and 5, it is designed so that the contour extracting circuit 38 will be constituted by first and second line memories 48 and 50, a vertical contour extracting circuit 52, a contour emphasizing frequency setting circuit 54, a horizontal contour extracting circuit 56, gain controllers 58 and 60, and a contour synthesis circuit 62 and contour components synthesized by the vertical contour component and horizontal contour component will be output, however, the present invention is not limited to this, the contour extracting circuit 38 may be provided at least with the contour emphasizing frequency setting circuit 54 and horizontal contour extracting circuit 56 and output horizontal contour components.

Industrial Applicability

As described above, the contour emphasizing circuit according to the present invention is applicable for expressing a video of high picture quality, contour-emphasized on the basis of the input of analog color video signals, by a display device (for example, matrix type display device) driven by digital color video signals like PDP, LCD, etc.

What is claimed is:

1. A contour emphasizing circuit comprising an A/D conversion circuit for converting input analog color video signals to output digital color video signals, a signal processing circuit for receiving the output digital color video signals and producing processed digital color video signals, a Y signal generation circuit for generating a Y signal from the output digital color video signals, a contour extracting circuit for extracting contour components from the Y signal and contour adders for adding contour components to the processed digital color video signals and produce contour-emphasized digital color video signals, wherein the contour extracting circuit comprises first and second line memories connected in series for delaying the Y signal generated by the Y signal generation circuit, a vertical contour extracting circuit for extracting a vertical contour component on the basis of the Y signal generated from the Y signal generation circuit, a Y signal from the first line memory and a Y signal from the second line memory, a contour emphasizing frequency setting circuit comprising n 1-dot delay elements connected in series for generating two kinds of delayed Y signals consisting of an n-dot delayed Y signal from the $n^{th}$ 1-dot delay element and a 2-dot delayed Y signal from the second 1-dot delay element for contour emphasizing frequency setting, based on the Y signal from said first line memory and, n being at least four, a horizontal contour extracting circuit for extracting a horizontal contour component on the basis of the Y signal from the first line memory and the two kinds of delayed Y signals generated by the contour emphasizing frequency setting circuit, and a contour synthesis circuit for synthesizing output contour components from said vertical and horizontal contour extracting circuits, respectively.

2. The contour emphasizing circuit of claim 1, wherein the A/D conversion circuit converts analog R, G and B signals to digital R, G and B signals and the contour emphasizing circuit additionally comprises a gain controller for receiving contour components extracted by the contour extracting circuit, multiplying the contour components by an adjustable coefficient and outputting adjusted contour components, a coefficient multiplication circuit for receiving the output of the gain controller, multiplying by coefficients Kr, Kg and Kb and outputting contour components for the R, G and B digital signals and the contour adders for adding the contour components for the R, G and B digital signals to the R, G and B digital signals, respectively.

3. The contour emphasizing circuit of claim 1, wherein the A/D conversion circuit converts analog R, G and B signals to digital R, G and B signals, the Y signal generation circuit generates Y signals from the digital R, G and B signals, the contour components extracted by the contour extracting circuit are adjusted in size in a gain controller, multiplied by coefficients Kr, Kg and Kb in a coefficient multiplication circuit, Kr, Kg and Kb being less than one, and added to the processed digital color video signals in the contour adders.

4. The contour emphasizing circuit of claim 1, wherein the contour extracting circuit comprises a core ring circuit for suppressing contour components of less than a specified level from being outputted.

5. The contour emphasizing circuit of claim 1, wherein the contour emphasizing frequency setting circuit comprises four 1-dot delay elements connected in series and outputs a 2-dot delay Y signal from the second 1-dot delay element and a 4-dot delay Y signal from the fourth 1-dot delay element.

6. The contour emphasizing circuit of claim 1, wherein said signal processing circuit performs picture element number conversion, gamma correction and phase adjustment on the output digital color video signals.

7. The contour emphasizing circuit of claim 1, where the A/D conversion circuit converts analog R, G and B signals to digital R, G and B signals, the Y signal generation circuit generates Y signals from the digital R, G and B signals, the contour emphasizing circuit additional comprises a gain controller for receiving contour components extracted by the contour extracting circuit, multiplying the contour components by an adjustable coefficient and outputting adjusted contour components, a coefficient multiplication circuit provided between the gain controller and the contour adders for receiving the output of the gain controller, multiplying by coefficients Kr, Kg and Kb and outputting contour components for the R, G and B digital signals, Kr, Kg and Kb being less than one, and the contour adders for adding the contour components for the R, G and B digital signals to the R, G and B digital signals, respectively.

* * * * *